United States Patent
Ding et al.

(10) Patent No.: US 9,582,755 B2
(45) Date of Patent: Feb. 28, 2017

(54) AGGREGATE CONTEXT INFERENCES USING MULTIPLE CONTEXT STREAMS

(71) Applicant: QUALCOMM Incorporated, San Diego, CA (US)

(72) Inventors: Li Ding, San Diego, CA (US); Vidya Narayanan, San Jose, CA (US); Jin Won Lee, San Diego, CA (US); Lukas D. Kuhn, San Diego, CA (US); Leonard Henry Grokop, San Diego, CA (US); Shankar Sadasivam, San Diego, CA (US); Alexandros Manolakos, Stanford, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 13/799,337

(22) Filed: Mar. 13, 2013

(65) Prior Publication Data

US 2013/0297547 A1    Nov. 7, 2013

Related U.S. Application Data

(60) Provisional application No. 61/643,829, filed on May 7, 2012.

(51) Int. Cl.
*G06F 17/00* (2006.01)
*G06N 5/02* (2006.01)
*H04M 1/725* (2006.01)

(52) U.S. Cl.
CPC .......... *G06N 5/02* (2013.01); *H04M 1/72563* (2013.01); *H04M 2250/12* (2013.01)

(58) Field of Classification Search
None
See application file for complete search history.

(56) References Cited

U.S. PATENT DOCUMENTS

| | | | |
|---|---|---|---|
| 4,959,865 A * | 9/1990 | Stettiner et al. | 704/233 |
| 7,079,645 B1 | 7/2006 | Short et al. | |
| 7,496,352 B2 | 2/2009 | Kaminsky et al. | |
| 8,187,182 B2 | 5/2012 | Kahn et al. | |

(Continued)

FOREIGN PATENT DOCUMENTS

CN    1630400 A    6/2005

OTHER PUBLICATIONS

International Search Report and Written Opinion—PCT/US2013/039967—ISA/EPO—Sep. 16, 2013.

(Continued)

*Primary Examiner* — Luis Sitiriche
(74) *Attorney, Agent, or Firm* — Kilpatrick Townsend & Stockton LLP

(57) ABSTRACT

Methods, systems, computer-readable media, and apparatuses for inferring context are provided. In one potential implementation, first context information associated with a first duration is identified, second context information is accessed to determine a context segmentation boundary; and the first context information and the second context information is then aggregated to generate an inferred segmented aggregated context. In a further implementation, the first context information is used to average inferred contexts, and the context segmentation boundary is used to reset a start time for averaging the first context information.

29 Claims, 8 Drawing Sheets

(56) References Cited

U.S. PATENT DOCUMENTS

| | | | |
|---|---|---|---|
| 2004/0249650 A1* | 12/2004 | Freedman et al. | 705/1 |
| 2005/0136842 A1 | 6/2005 | Fan et al. | |
| 2006/0107219 A1 | 5/2006 | Ahya et al. | |
| 2006/0120537 A1* | 6/2006 | Burnett et al. | 381/71.6 |
| 2007/0037605 A1 | 2/2007 | Logan | |
| 2008/0102902 A1* | 5/2008 | Epley | 455/567 |
| 2008/0143518 A1 | 6/2008 | Aaron | |
| 2009/0089288 A1 | 4/2009 | Petersen | |
| 2010/0317371 A1 | 12/2010 | Westerinen et al. | |
| 2011/0154208 A1 | 6/2011 | Horii | |
| 2011/0159921 A1* | 6/2011 | Davis et al. | 455/556.1 |
| 2011/0320202 A1 | 12/2011 | Kaufman | |
| 2012/0072381 A1* | 3/2012 | Cao et al. | 706/12 |
| 2012/0290434 A1* | 11/2012 | Moritz et al. | 705/26.7 |
| 2013/0072173 A1* | 3/2013 | Brady | 455/418 |
| 2014/0250184 A1* | 9/2014 | Brown et al. | 709/204 |

OTHER PUBLICATIONS

Horvitz, E., et al., "Bayesphone: Precomputation of Context-Sensitive Policies for Inquiry and Action in Mobile Devices", User Modeling 2005, Lecture Notes in Computer Science, 2005, vol. 3538, 11 Pages.

Khalil, A., et al., "Improving Cell Phone Awareness by Using Calendar Information", IFIP International Federation for Information Processing, INTERACT, 2005, vol. 3585, pp. 588-600.

Santos, A.C., et al., "Mobile Context Provider for Social Networking", On the Move to Meaningful Internet Systems: OTM 2009 Workshops, Lecture Notes in Computer Science, 2009, vol. 5872, pp. 464-473.

* cited by examiner

AGGREGATE CONTEXT INFERENCES USING MULTIPLE CONTEXT STREAMS

CROSS-REFERENCE

This application claims priority from U.S. Provisional Patent Application No. 61/643,829, filed May 7, 2012, entitled "AGGREGATE CONTEXT INFERENCES USING MULTIPLE CONTEXT STREAMS", which is hereby incorporated by reference, as if set forth in full in this document, for all purposes.

BACKGROUND

Aspects of the disclosure relate to electronic context determination. In particular, devices, systems, and methods for determining the context of an electronic device using sensor or application data available for analysis by a context engine.

In today's high-paced society, people can participate in a myriad of activities, visit dozens of places, and interact with tens to hundreds of people—all within a single day. Accurately estimating a person's situation or context may allow services or functionalities to be selectively presented or implemented.

Many mobile devices now include applications and sensors to collect information about an environment in which the device is operating and react to or change operational characteristics based upon that information. Such context awareness capabilities are becoming more and more prevalent in the communications industry. However, the large number of potential contexts makes it difficult to reliably and accurately estimate contexts.

Current context system infer context from senor data either instantaneously or by averaging instantaneous contexts over time. Instantaneously inferring context is challenging due to noisy mappings between user context and data.

For example, although when a user is in a meeting the most common output of a speech detector might be speech (as opposed to 'no speech'), the most common device motion state might be device at rest, and there may typically be many Bluetooth™ devices within range, it is still possible that at the time these low-level features/inferences are computed, speech may be determined to be not present, the motion state may reveal the device to not be at rest, and there may be no Bluetooth™ devices within range. For an instantaneous context then, any single determination may be in error due to expected noise or abnormalities in context information. Merely filtering to average out these noise or abnormal readings, however, comes at the cost of dynamic response. When a boundary between two different contexts is crossed, the inference is blurred out and performance degrades.

There is a growing need for new and useful techniques and structures for implementing context awareness in communication devices.

BRIEF SUMMARY

Embodiments described herein related to determining or inferring a context in which a device is operating. Such a determination may optimize device functionality based on context, and may further alter an interface provided by the device. Embodiments may particularly be directed to identifying and responding to changes in such inferred contexts. One potential embodiment is a method comprising accessing first context information associated with a first duration; accessing second context information to determine a context segmentation boundary; and aggregating the first context information and the second context information to generate an inferred segmented aggregated context.

Additional such embodiments may function where the first context information is ambient sound from a microphone and wherein the second context information is speech information from the microphone. Additional such embodiments may further include obtaining the first context information associated with the first duration at a mobile device using one or more sensors; and obtaining the second context information using second sensors different from the one or more sensors, wherein the second sensors are at the mobile device or a different device.

Additional such embodiments may function where aggregating the first context information and the second context information to generate the inferred segmented aggregated context comprises resetting an average inferred context to begin an average context starting at a time associated with the context segmentation boundary.

Additional such embodiments may function where the time associated with the context segmentation boundary comprises a time at which the context segmentation boundary was detected; and where a mobile device context setting associated with the inferred segmented aggregated context is delayed for a predetermined time following identification of the context segmentation boundary.

Still further embodiments of such a method may function where aggregating the first context information and the second context information to generate the inferred segmented aggregated context comprises associating the first context information with a first potential context; determining that the second context information is inconsistent with the first potential context; and identifying the inferred segmented aggregated context, the inferred segmented aggregated context being consistent with the second context information and different from the first potential context.

Still further examples of such embodiments may function where accessing the second context information to determine the context segmentation boundary comprises computing individual context inferences of limited temporal relevance to identify expected context transitions.

Another alternate embodiment of a method may comprise determining, by a first computing device, a first set of context inferences covering a first time period, wherein the first set of context inferences is determined from sensor data; and determining from the first set of context inferences, a context segmentation boundary associated with a first time delineating a first context prior to the first time from a second context following the first time within the first time period. Such a method further includes determining, by the first computing device, a second context inference from the sensor data associated with a second time following the first time within the first time period; determining an inferred segmented aggregated context from the second context and the second context inference; and selecting a set of device settings for the first computing device based on the inferred segmented aggregated context.

Such embodiments may further include identifying the context segmentation boundary from calendar data prior to determining the context segmentation boundary from the first context information or identifying the context segmentation boundary from social networking check-in data prior to determining the context segmentation boundary from the first context information.

Further embodiments of such a method may function where the sensor data comprises microphone data detected based on an audio environment of the first computing device or where the sensor data comprises location data detected based on a location of the first computing device. Still further embodiments of such a method may function where the sensor data comprises Bluetooth™ identifiers associated with Bluetooth™ devices proximate to the first computing device or where the sensor data comprises accelerometer data and wherein the context segmentation boundary is detected based on a change in the accelerometer data.

Still further embodiments of such a method may function where the inferred segmented aggregated context is computed from the first set of context inferences and the second context inference by selecting a most commonly occurring individual context inference over a second time period, wherein the second time period is a subset of the first time period.

Still further embodiments of such a method may include determining a confidence value associated with the inferred segmented aggregated context; and determining that the confidence value is above a confidence threshold prior to selecting the set of device settings for the first computing device based on the inferred segmented aggregated context.

Additional embodiments of such a method may function where the inferred segmented aggregated context is computed from individual context inferences of the first set of context inferences and the second context inference by averaging a likelihood or a log-likelihood associated with each potential context, and outputting a highest value context as the inferred segmented aggregated context.

Additional embodiments of such a method may function where the confidence value is computed as a function of averaged likelihood or averaged log-likelihood values for each potential context.

In another potential embodiment, a mobile device includes a processor; a first sensor coupled to the processor; and a non-transitory storage medium coupled to the processor. In such an embodiment, the storage medium includes instructions that when executed by the processor cause the mobile device to: access first context information associated with a first duration from the first sensor; access second context information to determine a context segmentation boundary; and aggregate the first context information and the second context information to generate an inferred segmented aggregated context.

Additional embodiments of such a device may function where the first sensor comprises a microphone and wherein the first context information comprises sound information recorded by the microphone; and wherein the second context information comprises a meeting reminder stored in a calendar within the storage medium as part of a calendar application operated by the processor.

In another potential embodiment, a device includes a means for determining a first set of context inferences covering a first time period, wherein the first set of context inferences is determined from sensor data; means for determining from the first set of context inferences, a context segmentation boundary associated with a first time delineating a first context prior to the first time from a second context following the first time within the first time period; means for determining a second context inference from the sensor data associated with a second time following the first time within the first time period; means for determining an inferred segmented aggregated context from the second context and the second context inference; and means for selecting a set of device settings based on the inferred segmented aggregated context.

Additional embodiments of such a device may include means for identifying the context segmentation boundary from calendar data prior to determining the context segmentation boundary from the first context information. Additional embodiments of such a device may include means for determining a confidence value associated with the inferred segmented aggregated context; and means for determining that the confidence value is above a confidence threshold prior to selecting the set of device settings based on the inferred segmented aggregated context, wherein the inferred segmented aggregated context is computed from individual context inferences of the first set of context inferences and the second context inference by averaging a likelihood or a log-likelihood associated with each potential context, and outputting a highest value context as the inferred segmented aggregated context.

Another embodiment may comprise a non-transitory computer readable medium including computer readable instructions that, when executed by a processor, cause a device to implement a method comprising: determining, by the device, a first set of context inferences covering a first time period, wherein the first set of context inferences is determined from sensor data; determining from the first set of context inferences, a context segmentation boundary associated with a first time delineating a first context prior to the first time from a second context following the first time within the first time period; determining, by the device, a second context inference from the sensor data associated with a second time following the first time within the first time period; determining an inferred segmented aggregated context from the second context and the second context inference; and selecting a set of device settings for based on the inferred segmented aggregated context.

Additional embodiments of such a computer readable medium may function where determining from the first set of context inferences, the context segmentation boundary associated with the first time delineating the first context prior to the first time from the second context following the first time within the first time period comprises identifying a movement across a door threshold to enter a room. Still further embodiments may function where the inferred segmented aggregated context comprises a meeting context associated with the room.

While certain embodiments are described above and additional embodiments are detailed as examples, it will be apparent to one of ordinary skill in the art that additional embodiments may be structured differently from the specifically described examples while remaining within the scope of the innovations claimed herein.

BRIEF DESCRIPTION OF THE DRAWINGS

Aspects of the disclosure are illustrated by way of example. In the accompanying figures, like reference numbers indicate similar elements, and.

DETAILED DESCRIPTION

Figure 1A:
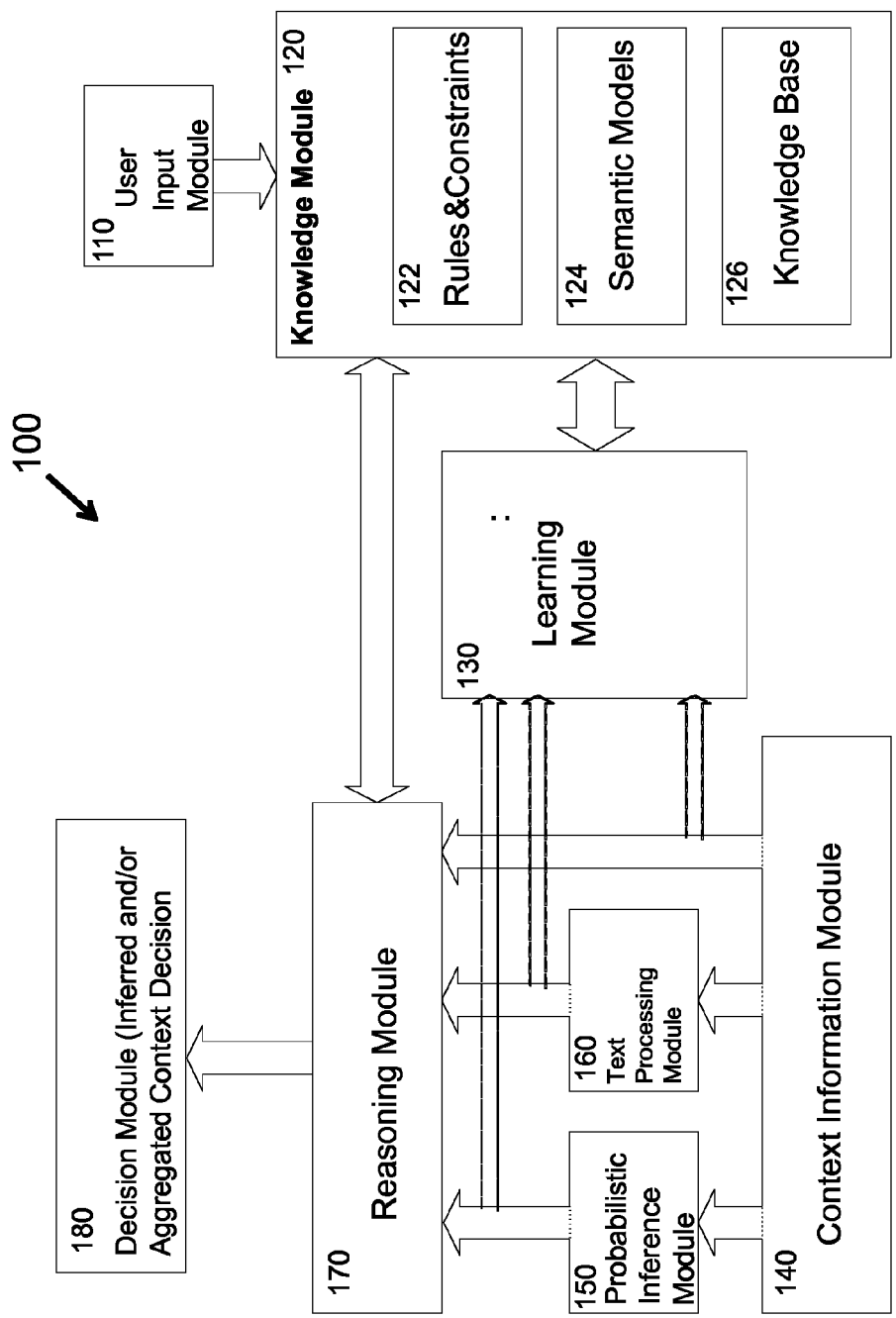
FIG. 1A illustrates a system diagram of a context engine for use in one potential embodiment.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Embodiments are directed to inferring a context in which a device is operating using multiple streams of context data and context segmentation boundaries to identify changes in context. For example, depending on the magnitude and type of noise detected by a microphone, certain contexts may be influenced or inferred. Background noise from multiple voices may indicate a certain ongoing context, while a door closing noise may indicate a transition. Information from other sensors may additionally be used or aggregated to provide additional confidence in an inferred context. In one potential embodiment, for example, a mobile device may constantly monitor sound information using a microphone. In conjunction with other context information, such as calendar and location information, the device may determine that the context is "alone typing in an office" and present an appropriate operating mode based on this context. While sound context data of typing may be periodically interrupted by short phone calls or conversation, the overall average context for a period of time may remain constant. This may allow certain rules to be automatically instituted, such as call screening rules, alert sounds for priority e-mails or text messages, or specific screen interfaces. Context segmentation boundaries may be identified as part of this operation to influence the transition to alternate contexts. For example, while periodic sounds may come from a person entering the office for a short conversation or a phone call, context information from a calendar indicating a meeting in conjunction with increased conversation may transition a context to an "in a meeting" context. Other context segmentation boundaries may reinforce this transition, such as the sound of a door closing, sound of multiple voices, or identification of a location in a meeting room. Without identification of certain context information as transitional, the device may struggle to identify contexts in a dynamic environment, and may oscillate quickly between different contexts. The use of a context segmentation boundary may thus act as a cue to transition to a new inferred context. The use of multiple streams of context information may thus provide a smoother context presentation at a device.

An additional example of a context segmentation boundary may function using location information and changes in location of a device as context information. A system may associate an area or a certain set of location information from global positioning data or network assisted location services with a certain context. When a user leaves an area associated with such a context, the change in location identified using the location context information may function as a context segmentation boundary. This location context information may further be used with other context information, such as WiFi signatures, speech with many voices, or calendar data to identify contexts and changes in context. Detection of a location change, a change in the number of voices detected, and a change in detected wireless signatures of other devices at the same time that calendar information indicates the start of a meeting may provide a high degree of confidence in an inferred context along a context segmentation boundary associated with these changes.

As used herein, "context information" refers to data that is received at a computing system for use in inferring context. Such information may be from hardware transceivers that directly measure a physical aspect of the environment, such as light, sound, or device movement. Such information may be considered as coming from "hard" sensors such as global positioning systems (GPS), microphones, wireless antennas, accelerometers, magnetometers, gyroscopes, Bluetooth™ systems, ambient light monitors, proximity monitors, cameras, pressure sensors, temperature sensors, or any other such similar hardware sensors. Context information may additionally be abstract information stored by an application within a device. Calendar, contact, or profiles identifying other parties or devices interacting with a user or user device may be examples of such abstract information. Such context information may be considered as coming from "soft" or "software" sensors such as calendar, email, SMS log, call log, application usage, or other such device applications functioning as sensors to input data to a context system.

As used herein, "context" is used to describe a situation in which a device is operating. Examples of contexts include: busy, available, in meeting, traveling in a car, traveling in a plane, at home, in the office, at the gym, eating, or any other such concept of an environment. The environment context may then be used by a device to select settings. For example, if a context is "traveling in a plane" a device may be set to automatically reply to phone messages indicating that the user is unavailable. If a context is "in meeting" a ringer may automatically be silenced.

Similarly, as used herein "inferred context" refers to the computer implemented decision making by a device to determine what context the device is currently operating under. Inferred context describe any inference (high or low-level) that can be made from sensor data. The list of possible contexts may be application specific to a particular context system or context engine. The contexts may be inferred from a single sensor (uni-modal data) or from multiple sensors (multi-modal data). Some sample lists are: enterprise situation inference (in meeting, working alone, lunch, gym, commuting, lecture); type of motion (vehicular motion, pedestrian motion, stationary); motion state classification (walking, running, sitting, standing, fiddling, resting, driving); speech detection (speech, no speech); indoor/Outdoor detection (indoor, outdoor); meeting detection (in a meeting, not in a meeting); or any other such context.

Individual sensors may provide a stream with context information, such that new and updated context information may be received over time. That context information may be associated with a number of potential contexts while being inconsistent with other potential contexts. As used herein, "aggregated context" refers to a context that has been derived from multiple sensors to derive a most likely context given the potential contexts and inconsistent contexts for each stream of context information.

As used herein, "context segmentation boundary" refers to context information indicating an expected change in context that may influence the determination of an inferred or aggregated context. For example, a start time for a meeting in a calendar may function as a context segmentation boundary for a transition from an "available" context to a "busy in meeting" context. While the context does not necessarily match the exact start time indicated by the meeting, this context segmentation boundary may be aggregated with other information to identify the appropriate transition between contexts. If for example, a user is running late, the context segmentation boundary may be used with location and noise context information to more sensitively identify the actual transition time between contexts. The context segmentation boundary may be a boundary marker determined from the sensor inputs in an independent manner from the context inferences themselves.

A context segmentation boundary may also be used to determine the duration over which the current context inferences should be filtered/averaged. The assumption in such embodiments is that the context segmentation boundary accurately captures the point in time at which the current context segment began, but does not capture information about what the current context is. GPS may, for example, function as a context segmentation boundary for a change of place. GPS identifies that the user has transitioned from one place to another. For example, suppose a system functions to infer a context which is the type of place the user is at (e.g. home vs. work vs. neither). The context segmentation boundary is placed at the time $t_0$ at which the user arrives at the new place. At any point beyond that the place type is inferred by averaging the context inferences from time $t_0$ until the current point in time.

Clusters of location information for particular inferred contexts may then be refined over time as additional location information is gathered in conjunction with certain contexts. For example, if a meeting context is identified at a certain time and with certain other attendees, the location data may identify specific entrance and exit locations for a meeting room. When the door location is crossed, the system may use this as a high value input for context inference, as the door location may function as a context segmentation boundary. Additional location clustering data gathered over time may be used for future context inference to more quickly and accurately identify when a location threshold has been crossed and when a device should adjust an inferred context based on the movement across such a context segmentation boundary.

For other locations with less well defined boundaries, a greater amount of location data or other context information may be required. A greater amount of location clustering data may eventually identify boundaries for an open space such as a public park that is associated with a particular context. For such locations, identifying an entry or exit from the context area may be less specific, and may receive a lower weight in a decision inferring context using multiple types of context information to verify or calculate confidence that the user is operating in a particular inferred context and that the context segmentation boundary for the location is meaningful for a current inferred context.

Figure 6:
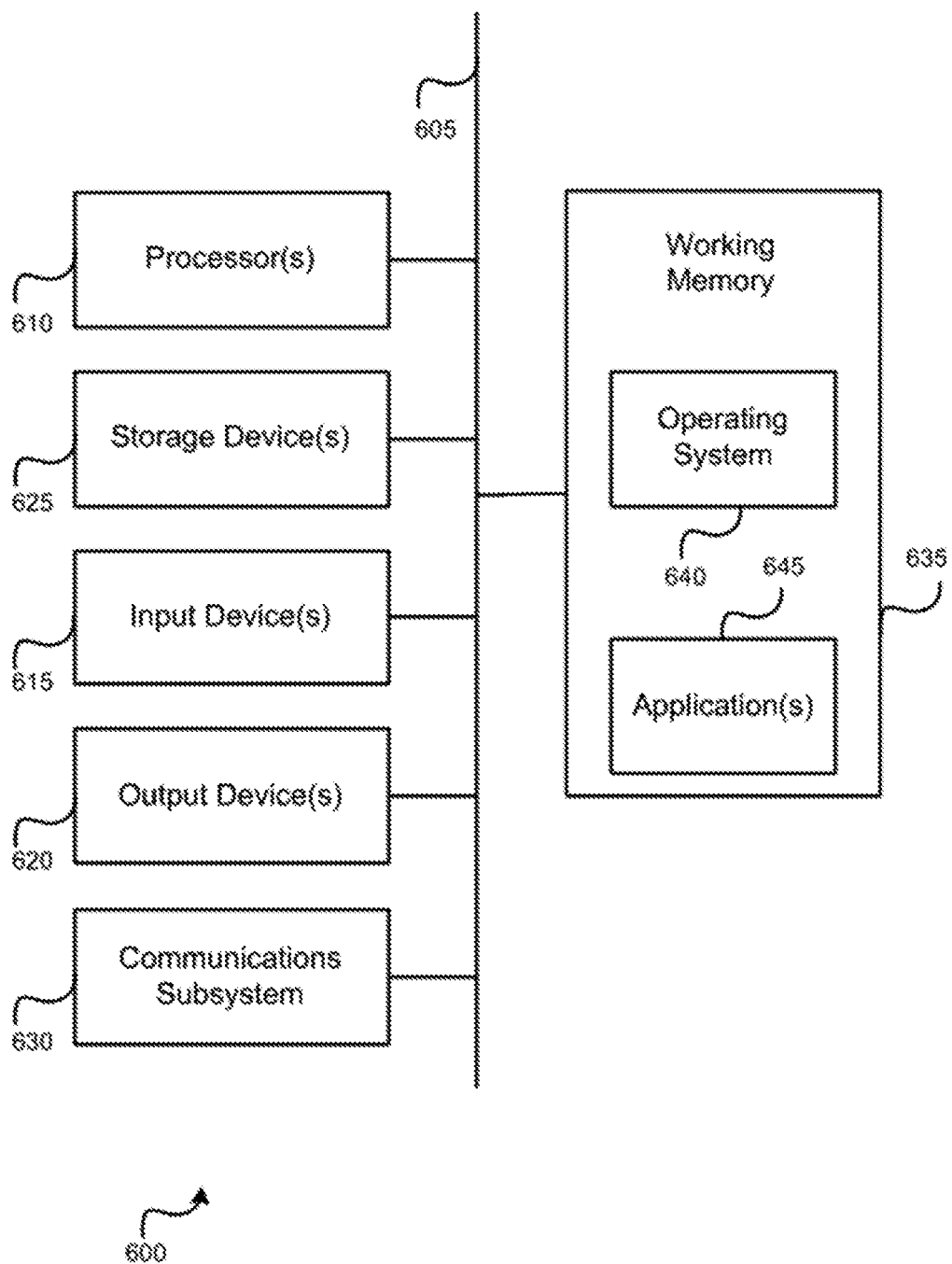
FIG. 6 illustrates an example of a computing system in which one or more aspects may be implemented according to various embodiments.

As used herein, the terms "computer," "personal computer" and "computing device" refer to any programmable computer system that is known or that will be developed in the future. In certain embodiments a computer will be coupled to a network such as described herein. A computer system may be configured with processor-executable software instructions to perform the processes described herein. FIG. 6 provides additional details of a computer as described below.

As used herein, the term "component," "module," and "system," is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

FIG. 1A describes one potential implementation of a context engine 100 that may function to create inferred and/or aggregated context decisions. Context engine 100 includes user input module 110, knowledge module 120, learning module 130, context information module 140, probabilistic inference module 150, text processing module 160, reasoning module 170, and decision module 180.

User input module 110 may function as any input system for receiving user settings for a context system. In certain embodiments, user input module 110 may include a user registration for a context service, including an input of user registration information via a web server or other such registration services. User input module 110 may also function to receive user context selections and settings for storage in knowledge module 120. For example, a user may identify particular contexts which the user wants to have automatically inferred by context engine 100. The user may additionally identify settings for each identified context, such as sound settings, application settings, and user interface settings that may change between different contexts. The user may also specifically identify contexts not to be inferred, and may also identify a default context and device settings for a default context to be used when the context engine 100 is unable to adequately infer a context.

Knowledge module 120 may include a record of models, rules, and context history to improve context decision making. As shown in FIG. 1A, knowledge module may include rules and constraints 122, semantic models 124, and knowledge base 126. Rules and constraints may be rules and limits set by a device on device control available to a context system upon determination of an aggregated context decision. Rules and constraints 122 may also include user settings. Semantic models 124 may include tailored or customizable rules for context information when text is used to infer context. For example, in certain embodiments "coffee" in a calendar may be interpreted to be equivalent to "meeting" or a particular type of meeting. Specific language usage identified over time as associated with particular contexts may also be included in semantic models 124, as a learning module 130 identifies, updates, and improves context decision making based on context information, and stores learned information in knowledge base 126.

Learning module 130 may thus identify errors or misassignment of inferred contexts in order to improve future operation of context engine 100. Such errors may be identified in response to user feedback, or may be identified by contexts changing in unexpected ways, or by user device usage out of character with a current inferred context. Such learning may additionally be an option set by a user to allow learning module 130 to automatically update rules and constraints 122 based on learned successes in inferring contexts.

Context information module 140 may serve to gather context information from sensors, and to communicate that information to various analysis modules for use in inferring context. Probabilistic inference module 150, text processing module 160, and reasoning module 170 may each comprise different methods for inferring context from context information. Probabilistic inference module 150 may include analysis of expectations that may be derived from context data, and text processing module may parse text information that is received as context information to identify contexts which are consistent with the identified text. All of this information, including multiple streams of context information and various inferences or intermediate context inferences may be communicated to a reasoning module 170 which may use predefined rules with learned rules and context knowledge or history to analyze context information in various forms. Decision module 180 may then identify one or more final inferred context or aggregated context decisions from all of the received context information and analysis. In certain embodiments, for example, certain contexts may be related, and compatible, such that multiple contexts and their associated rules be selected at the same time, as is discussed further with respect to FIG. 1B.

In certain embodiments, this decision from decision module 180 may be that there is excessive uncertainty, and no inferred context may be identified. In one example embodiment, multiple potential contexts may be identified by reasoning module 170, and a score assigned to each potential context. If the highest score is below a threshold set by rules and constraints 122, then the decision module 180 may set a default context as no aggregated context was identified.

Figure 1B:
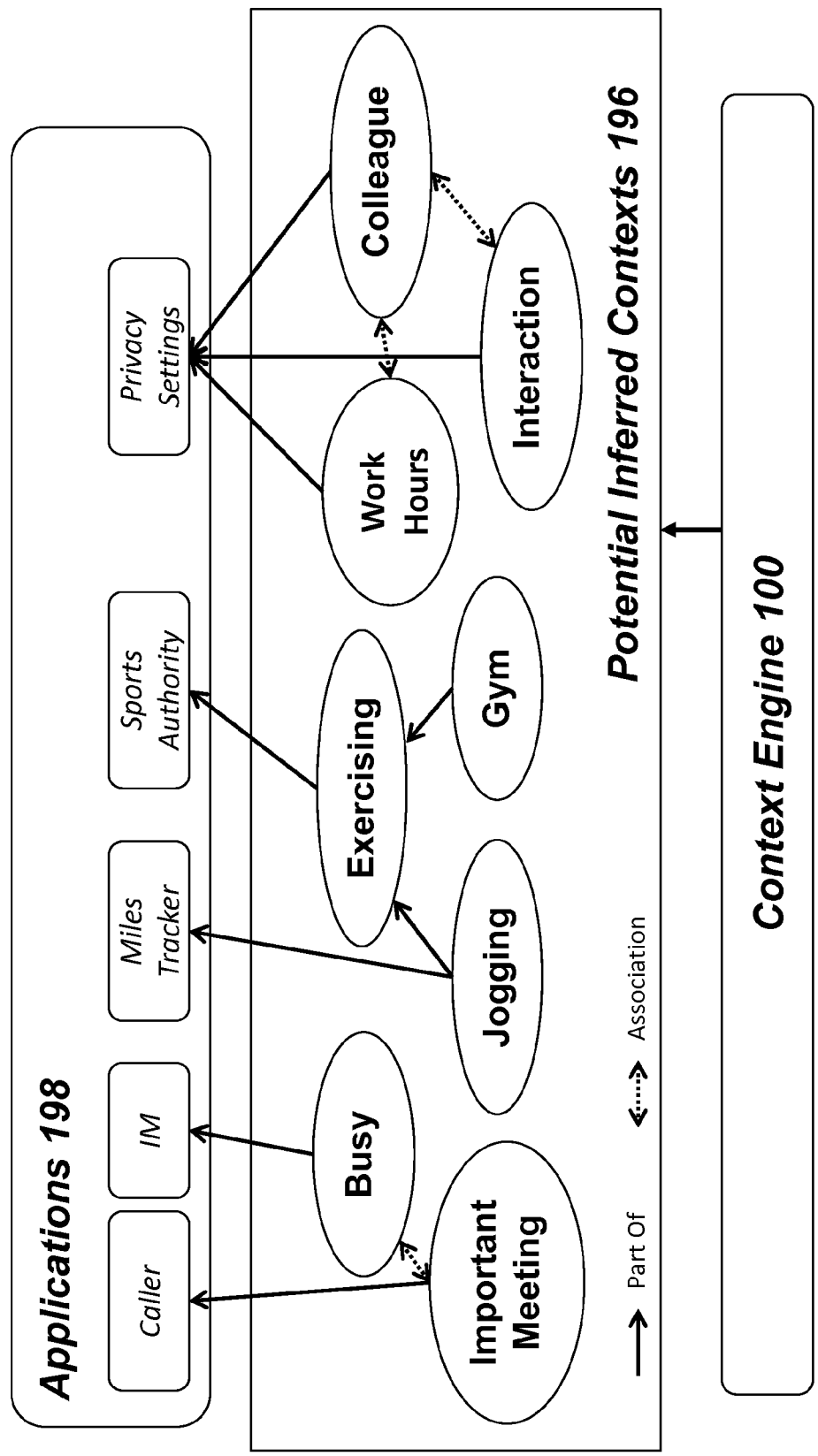
FIG. 1B illustrates a system for control of applications in a device according to one potential embodiment.

FIG. 1B further illustrates a context system which may operate in conjunction with a context engine 100 described in FIG. 1A. FIG. 1B includes context engine 100, potential inferred contexts 196, and applications 198. In one potential embodiment, these may all exist on a single mobile device. In alternate embodiments, different modules of a context engine or contexts inferred by a context engine may be implemented on a device networked to the mobile device, and may communicate with the mobile device via a network. When a final inferred context or aggregated context is identified from all potential inferred contexts 196 by context engine 100, the system may function to call or provide particular settings to selected applications 198.

For example, in certain embodiments if "busy" is identified as the aggregated context, the instant messaging may have certain settings invoked. If "important meeting" is the aggregated context, then certain calling rules may be invoked, and rules associated with the "busy" context may also be invoked, since the contexts are associated. Similarly, if "jogging" is identified as an aggregated context, the miles tracker application on a mobile device may be activated, and a sports authority application may also be automatically invoked. Similarly, privacy settings for particular applications or an entire device may be set for applications 198 depending on the identified aggregated context output from context engine 100. Thus a context system may operate to provide functionality via applications 198 in response to context engine 100 identifying one or more contexts from potential inferred contexts 196.

Figure 2:
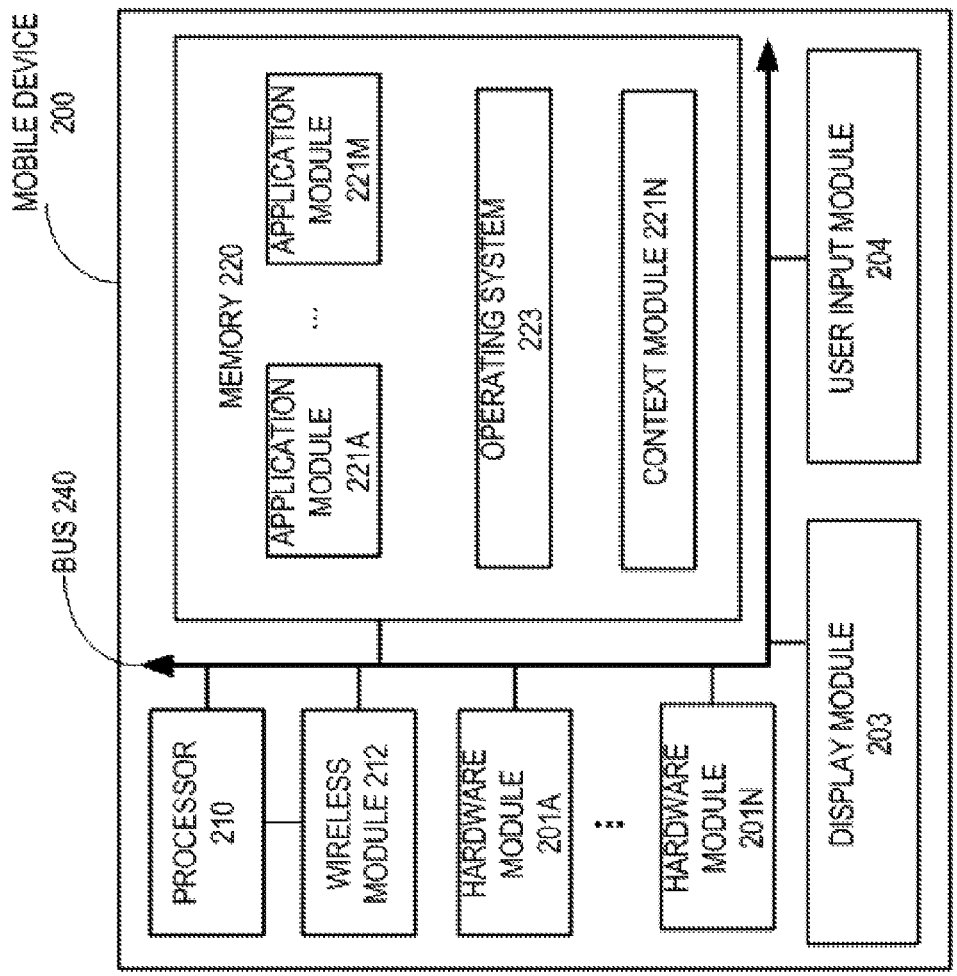
FIG. 2 illustrates a mobile device for use with a context system in accordance with various embodiments.

FIG. 2 is block diagram illustrating one potential embodiment of a mobile device that may be used in conjunction with embodiments described herein. Such mobile devices may include hardware, software, or firmware to implement all or part of a context inference system, either alone or in conjunction with additional networked computing devices. Such a context system may be a mobile device 200, which may be any mobile device such as a smart phone, cellular phone, personal digital assistant, tablet computer, personal media player as well as any other type of portable electronic device offering similar or combined functionality. Such a mobile device 200 may implement any aspects of context engine 100 or applications 198 as shown in FIG. 1.

It should be appreciated that device 200 may also include tactile buttons, a power device (e.g., a battery), as well as other components typically associated with a portable electronic device. Accordingly, FIG. 2 is not to be construed as limiting because some components are omitted.

In the embodiment shown at FIG. 2, device 200 includes processor 210 configured to execute instructions for performing operations at a number of components and can be, for example, a general-purpose processor or microprocessor suitable for implementation within a portable electronic device. Processor 210 is communicatively coupled with a plurality of components within mobile device 200. To realize this communicative coupling, processor 210 may communicate with the other illustrated components across a bus 240. Bus 240 can be any subsystem adapted to transfer data within mobile device 200. Bus 240 can be a plurality of computer buses and include additional circuitry to transfer data.

Memory 220 may be coupled to processor 210. In some embodiments, memory 220 offers both short-term and long-term storage and may in fact be divided into several units. Memory 220 may be volatile, such as static random access memory (SRAM) and/or dynamic random access memory (DRAM) and/or non-volatile, such as read-only memory (ROM), flash memory, and the like. Furthermore, memory 220 can include removable storage devices, such as secure digital (SD) cards. Thus, memory 220 provides storage of computer readable instructions, data structures, program modules, and other data for mobile device 200. In some embodiments, memory 220 may be distributed into different hardware modules.

In some embodiments, memory 220 stores a plurality of application modules 221A-221M. Application modules 221A-221M contain particular instructions to be executed by processor 210. Memory 220 can store any number of application modules. A respective one of application modules 221A-221M can be, for example, a calendar application, a map location application, a power management application, a smart alert application, a social media application (e.g., Twitter™ or Facebook™), an accelerometer application, a weather application, a temperature presentation application, or any application-type module having instructions to be executed by processor 210. In certain embodiments, sensors operated by a mobile device may have associated applications, such that context information from sensors operated by mobile device 200 may be accessed by an application rather than directly from a sensor or sensor firmware.

In one potential embodiment, context inference systems may operate as a special context module 221N. Such a module may implement any operation, determination, or calculation associated with determining a context of mobile device 200 as described in various embodiments. For example, context module 221N may gather context information from sensors and other applications, determine inferred contexts from individual sets of context information, identify context segmentation boundaries, aggregate context information to determine an aggregated context, and control context based changes to mobile device 200 such as varying interface settings based on an aggregated context.

In some embodiments, memory 220 includes an operating system 223. Operating system 223 may be operable to initiate the execution of the instructions provided by application modules 221A-221N and/or manage hardware modules 201-502. Operating system 223 may be adapted to perform other operations across the components of device 200 including threading, resource management, data storage control and other similar functionality.

In some embodiments, mobile device 200 includes one or more wireless modules 212. Wireless modules 212 may include a Wi-Fi transceiver, a transceiver for communicating with cellular telephone towers, or any other such module for implementing wireless communications. Such wireless modules 212 may be used as part of mobile device 200 and applications 201-202 to communicate with servers which may assist in context determination. For example, in certain embodiments, context module 221N may communicate context information over wireless module 212 to assistance servers which may assist in determining an aggregated context. Analyzed data or context associated information may then be returned to mobile device 200 via wireless module 212 for setting an aggregated context at mobile device 200.

Additionally, in some embodiments, mobile device 200 includes a plurality of hardware modules 201-202. Each of hardware modules 201-202 is a physical module within device 200. However, while each of hardware modules 201-202 is permanently configured as a structure, a respective one of hardware modules 201-202 may be temporarily configured to perform specific functions or temporarily activated. A common example is an application module that may program a camera module (i.e., hardware module) for shutter release and image capture. A respective one of hardware modules 201-202 can be, for example, an accelerometer, a satellite navigation system receiver (e.g., a GPS module), a pressure module, a temperature module, an audio output and/or input module (e.g., a microphone), a camera module, a proximity sensor, an alternate line service (ALS) module, a capacitive touch sensor, a near field communication (NFC) module, a Bluetooth™ transceiver, a cellular transceiver, a magnetometer, a gyroscope, an inertial sensor (e.g., a module the combines an accelerometer and a gyroscope), an ambient light sensor, a relative humidity sensor, or any other similar module operable to provide sensory output and/or receive sensory input. In some embodiments, one or more functions of the hardware modules 201-202 may be implemented in firmware or software as various modules.

In addition to hardware modules 201-202 and application modules 221A-221M, mobile device 200 may have a display module 203 and a user input module 204. Display module 203 graphically presents information from device 200 to the user. This information may be derived from one or more application modules 221A-221M, one or more hardware modules 201-202, a combination thereof, or any other suitable means for resolving graphical content for the user (e.g., by operating system 224). Display module 203 can be liquid crystal display (LCD) technology, light emitting polymer display (LPD) technology, or some other display technology. In some embodiments, display module 203 is a capacitive or resistive touch screen and may be sensitive to haptic and/or tactile contact with a user. In such embodiments, the display module 203 can comprise a multi-touch-sensitive display.

Additional embodiments of a mobile device may further comprise various portions of computing devices as are detailed below with respect to FIG. 6.

Figure 3A:
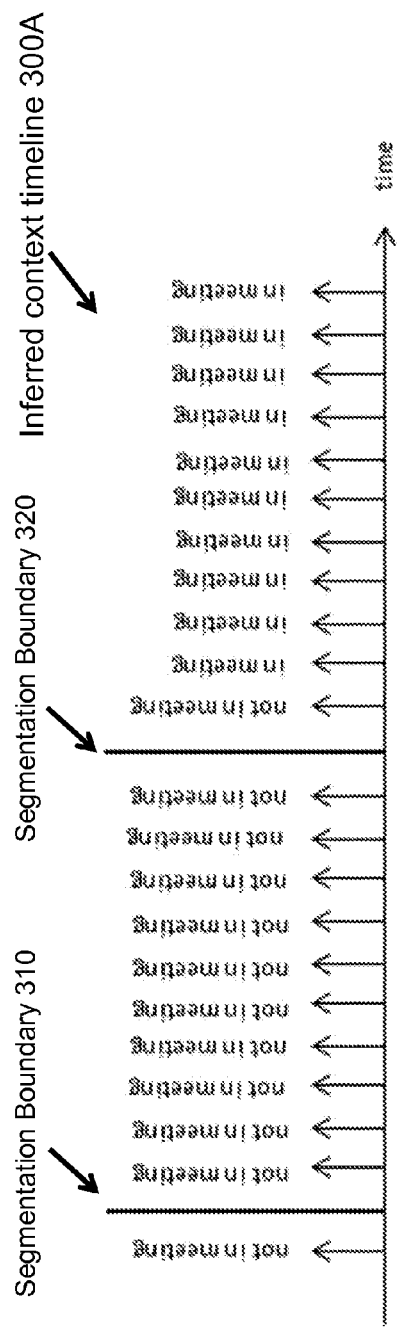
FIG. 3A illustrates changes in an inferred context for a system using context segmentation boundaries in accordance with one potential embodiment.
Figure 3B:
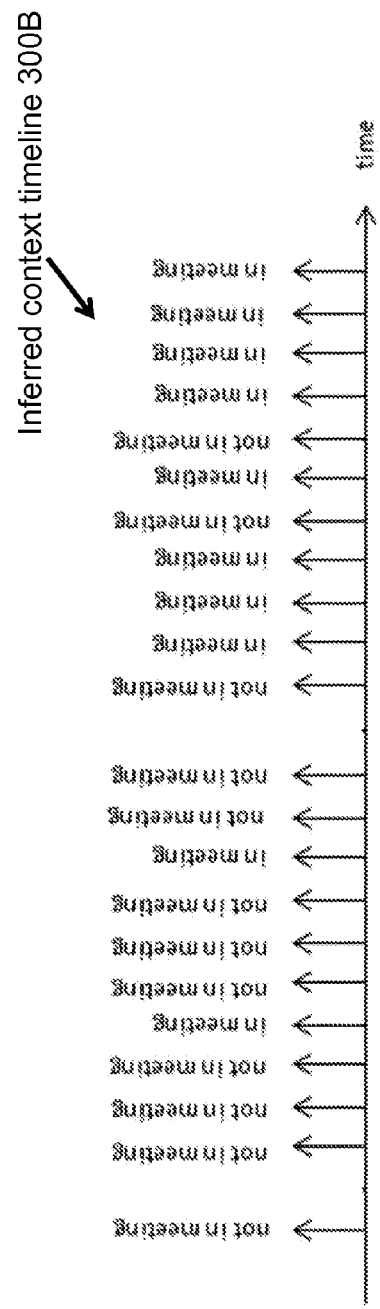
FIG. 3B illustrates changes in an inferred context for a system not using context segmentation boundaries in accordance with an embodiment.

FIGS. 3A and 3B describe two separate timelines of inferred contexts. FIG. 3A shows inferred context timeline 300A with context segmentation boundaries 310 and 320 which may be used to determine contexts as part of inferred context timeline 300A included, and where individual inferred contexts at each arrow are an average or function of all contexts since the occurrence of the last context segmentation boundary. FIG. 3B shows inferred context timeline 300B. In timeline 300B, each arrow is associated with an individually determined context that is unrelated to previously determined inferred contexts, unlike the averaged inferred contexts of timeline 300A. In each timeline, the time is shown as increasing to the right, with periodic arrows showing a context as either "not in meeting" or "in meeting." Each context label may be associated with an output decision from a context engine identifying an inferred context at a particular time. While in FIG. 3, these individual contexts for a particular time are shown as periodic, in various alternative embodiments, such inferred context decisions may be non-periodic, continuous, or such decisions on inferred context may be made according to any timing.

As described above, context segmentation boundaries in FIG. 3A may function to reset an averaging of context information, essentially acting as a trigger that a context may be changing, and that past context information may not be relevant to a current context, and so removing past context information form consideration in inferring a context may be helpful. While individual context inferences a shown in FIG. 3B shown individual inferences changing, an averaged inference with the average reset at a context segmentation boundary in timeline 300A shows a much more smooth response to an average change in inferred contexts. Similarly, an inferred context timeline that would show an averaged context of timeline 300B without the use of context segmentation boundaries would take significantly longer to transition from a "not in meeting" context to an "in meeting" context than is shown in timeline 300A.

Figure 3C:
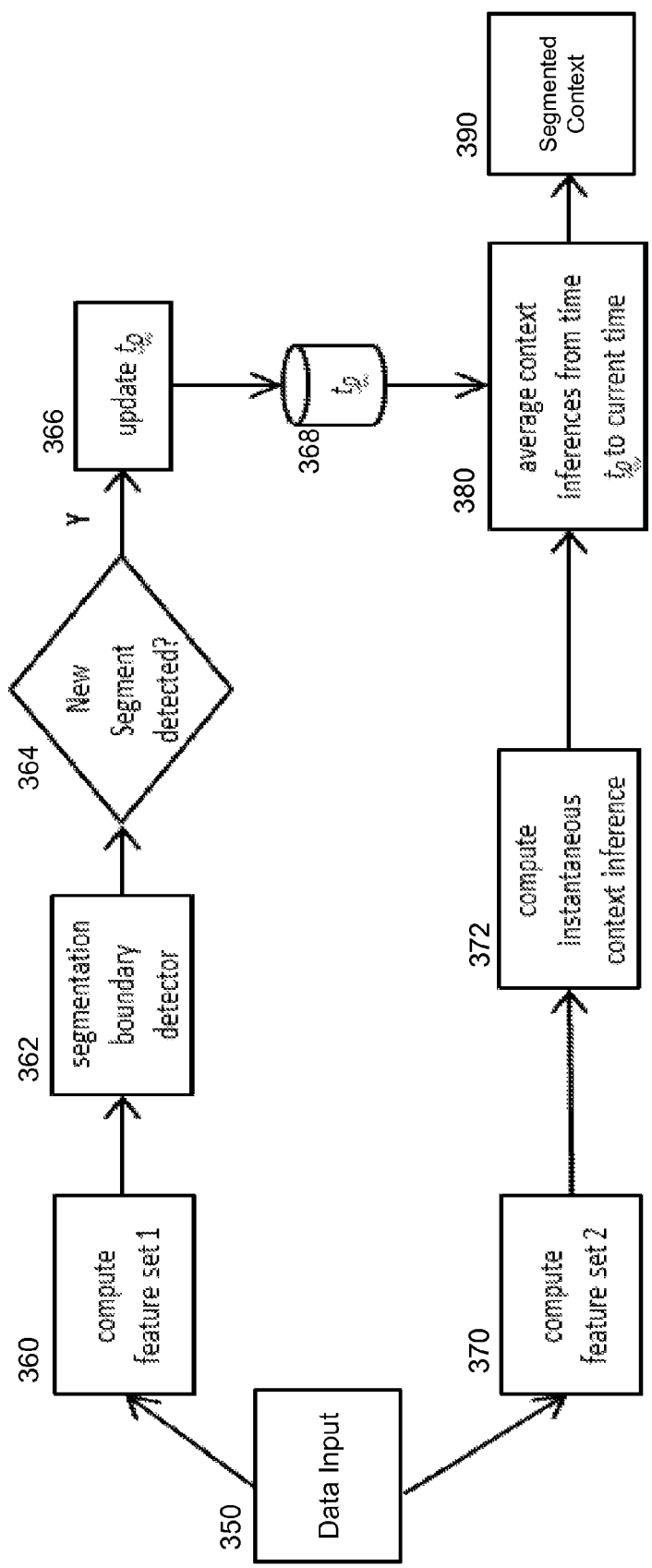
FIG. 3C illustrates a method of determining an aggregated context in accordance with one potential embodiment.

FIG. 3C then describes a method of inferring context using context segmentation boundaries in accordance with an embodiment. In 350, context data or information is input to a context system. A first path identifies context segmentation boundaries while a second path repeatedly computes instantaneous inferred contexts. In the first element 360, a feature set relevant to identifying context segmentation boundaries is determined from the input data. This may include all context information, or may include only certain context information relevant to identifying context segmentation boundaries.

In element 362, context data from the first computed feature set is analyzed to identify a context segmentation boundary. This may be as simple as identifying a calendar entry received from a soft sensor calendar application. In other embodiments, continuous streams of context information may be analyzed to identify a context segmentation boundary. There are various algorithmic techniques for computing the context segmentation boundaries. Two potential techniques are 1) change-point detection and 2) temporal clustering.

Change-point detection may involve detecting that the current features have been consistently taken on distinctly different values than at an earlier time. In a probabilistic setting this problem can be stated as detecting that the underlying distribution from which the current features are being drawn is distinctly different from the underlying distribution from which the features were drawn at an earlier time.

Temporal clustering refers to grouping data points that appear similar in some feature space and/or occur at similar times. For example, if the data stream consists of a trace of latitude and longitude coordinates obtained by performing GPS fixes, clustering would involve grouping the fixes into a finite number of places that the mobile device visits and spends time at. Thus one distinct segment of consecutive fixes may correspond to a user of the mobile device being at home, and may belong to the same cluster as a second distinct segment of consecutive fixes that occurs on a different day, when the user is again at home. Another cluster may correspond to fixes obtained when the user of the mobile device is at work.

There are several specific examples of different data streams that may be clustered. For example, audio environment data may be clustered. This may consist of batches of microphone data, with each batch obtained over duration. In one embodiment, the duration may be one minute. Each cluster may corresponds to a distinct audio environment. One cluster may identify typing noise, one cluster may identify two or three party communications, one cluster may identify car noise, and one cluster may identify large group conversation. A change from one cluster to another may be identified as a context segmentation boundary. Additionally clustering may be coupled with direct sensor detection of context information to provide multiple context segmentation boundaries at a particular time. For example, the sound of a door closing may be direct context information identified as a context segmentation boundary, and may be accompanied by a cluster change in audio data.

In one specific example of audio clustering, up to L clusters may be identified, and $z_t$ may represents the unknown cluster ID of the audio environment during the tth minute of the day. Audio features computed from the raw audio data stream observed during the tth minute of the data such as Mel-Frequency Cepstral Coefficients (MFCCs.) MFCCs from context information may then be used as audio features for identifying clusters and changes between clusters. MFCCs are well known in the art for use in speech recognition. In such an embodiment, the cluster ID at a given point in time is a function of the cluster ID at the previous point in time in conjunction with detected MFCCs.

In another example, location coordinates may be used as clusters. These may be obtained through location fixes such as fixes from GPS or network enabled location assistance data. Each coordinate cluster may correspond to a macro place (i.e. a place the size of a building) that a user visits.

WiFi fingerprints may also function as clusters of context information. These may consist of sets of visible WiFi access points, their respective RSSI's (i.e. signal strengths), and their respective response rates (i.e. fraction of the time they are visible when successive scans take place). Each cluster corresponds to a micro place (i.e. a place the size of a room) that a user visits.

Bluetooth™ fingerprints may also function as clusters of context information. These may consist of sets of visible Bluetooth™ devices, their respective RSSI's, their device class, and their respective response rates. Each cluster corresponds to a distinct Bluetooth™ environment.

Motion states may be clustered as well. This consists of batches of accelerometer and/or gyroscope and/or magnetometer data, each batch obtained over a duration of 10-30 s or so. Each cluster correspond to a distinct set of motions. Many other techniques for clustering context information to identify context segmentation boundaries as context information transitions between clusters will be apparent in conjunction with the details provided herein.

Returning to FIG. 3C, then, context segmentation boundaries may be determined in 362 by any number of means, such as direct receipt of a context segmentation boundary from sensor data, change point detection, or detection of a change associated with a data cluster as described above. When a new context segmentation boundary is detected by any means in 364, the base time from which individual contexts are used to calculate an averaged context is updated in 366, and in 368 the new base time passed to a function to create a new inferred context in conjunction with the second path.

In the second path, the context information from 350 is used to compute a second feature set. This involves selecting a second set of context information from all available context information for computing instantaneous context inferences at a particular time. This feature set of 370 may be the same feature set from 360, or may be a different feature set. In certain embodiments, features may be different but complementary. For example, in one potential embodiment, a meeting start time and end time may be part of feature set one of 360, while a complementary set of calendar information indicating that a meeting is ongoing may be part of feature set two. In various embodiments, feature sets may be selected by user preference, if, for example, a user's privacy preferences prevent a microphone from detecting a sound at all times, but a user does not have privacy issues providing a calendar to a context system.

After the feature set two is determined in 370, the context information from feature set two may be used to compute an inferred context for a particular time. This may involve computing potential contexts for context information from individual sensors, and then aggregating the potential contexts into an aggregated context for a particular instant in time, or may involve a more complex function of context data from multiple sensors.

In 380, the individual determinations of inferred context for a particular point in time may be averaged from the most recent time at which a context segmentation boundary was identified. When a new context segmentation boundary is identified and provided to element 380 from element 368, the average is essentially deleted, and a new average is determined starting from the new base time at which the most recent context segmentation boundary was detected. In element 390, the inferred segmented aggregated context may be output. As shown in FIGS. 3A and 3B, while the inferred segmented aggregated context may change, this change is more likely to track with a context segmentation boundary, and to stabilize until another context segmentation boundary is identified.

In one potential embodiment, in place of the instantaneous context inferences of 372, a context system may compute instantaneous context inference distributions. If at instantaneous time t the context takes one of K values (e.g. for simple microphone context may be speech or no speech, K=2), then this is a (probability) vector $p(t)=[p_1, \ldots, p_K]^T$ where $p_1 + \ldots + p_K = 1$. The averaging of context inferences from time $t_0$ to the current time $t_c$ is replaced with averaging $\log(p(t))$ over the same time period. Such a system may provide more detailed information for detecting errors and improvements to provide to a knowledge module by tracking all potential distributions of inferred context with probability, and providing feedback to alter weights or function values for calculating probabilities in future calculations of inferred context.

In an additional potential alternative embodiment, rather than selecting an averaging time to begin at the instant the context segmentation boundary is identified, the system may instead average inferred contexts for a predetermined amount of time before allowing a context to change. This may prevent rapid changes in context if a context segmentation boundary is accompanied by noise or rapid variation in context information. for example In one instantiation of the invention this is done by waiting a fixed latency time L before outputting the context inference. Typically the larger L, the greater the accuracy of the inference.

In another instantiation this is achieved by waiting a variable latency time, until the confidence associated with the context inference is above a certain target threshold. The confidence of the inference can be computed in a number of ways. In one instantiation the confidence value at time t is computed as follows:

$$C(t) = \frac{\sum_{t=t_0}^{t_C} \log(p_{i1}(t)) - \log(p_{i2}(t))}{\left| \sum_{t=t_0}^{t_C} \log(p_{i1}(t)) + \sum_{t=t_0}^{t_C} \log(p_{i2}(t)) \right|}$$

Where i1 is the context state with the highest value of $\Sigma_{t=t_0}^{t_C} \log(p_1(t))$ and i2 is the context state with the second highest value. In the variable latency approach a timer can be set to force an inference output in the event the confidence value never crosses above the target threshold.

In another embodiment the system may withhold outputting context inferences until the current segment ends at which point the average context inference associated with the entire segment is outputted for the current time point and every previous time point in the segment.

Thus as described herein according to certain embodiments, statistical inferencing solutions may produce instantaneous inferences or inferences over a certain duration. Similarly, for high level situations, inferences may be done over a much longer duration. For instance, a meeting may be a situation that typically lasts in the order of tens of minutes. The underlying low level inferences that contribute to the inference of a meeting may include things like presence of speech, type of place, number of attendees, proximity of attendees, etc. However, the presence of speech, for instance, may be inferred over a few seconds or a few minutes at most. An aggregate inference of speech then needs to be made over a longer duration to then determine, along with other contexts, whether the user is in a meeting.

Systems and techniques of some embodiments of the present invention aggregate inferences using bounding information to assist in situation awareness. In some instances, a duration of one context (e.g., a place visit, calendar event duration, time, etc.) can be used to derive an aggregated-context output for another context. For example, for a duration of an event on the calendar, an aggregate speech inference can be produced from multiple individual speech inferences to then reason about whether the user is in a meeting for that duration. The aggregation can be performed for part or all of a potential event duration (e.g., a duration of a calendar event or a duration that a user is at an approximately same place).

The generated aggregate contexts may then be represented using a flexible concept model so that it can be used in combination with other contexts for reasoning. Individual inferences can be collected (e.g., at a client, server, network resource, etc.), such that one or more aggregated contexts can be generated. In some embodiments some aggregation may be performed by a client and some by network resource(s). In one embodiment, for example, a client may be a mobile device as described above.

Over a first duration (e.g., beginning at a first time and extending for a particular length of time, beginning at a first time and ending at a second time, beginning at a time indicated by a particular event and extending for a particular length of time, etc.), the client may access information generated by one or more sensors that may be indicative of context, either directly or indirectly (first context information). For example, an audio sensor may sense information indicative of speech, indicating that the mobile device is proximate to a person speaking. However, the information may also be consistent with the user being on a phone call, having a conversation with one other person, being in a speech-rich environment such as a public venue, or being in a meeting.

The client may obtain second context information associated with a second duration or a second point in time with only limited temporal relevance; the second context information may be sensor information or other information such as calendar information. The client may aggregate the first context information and the second context information to determine an aggregated context. As noted above, for the example of a meeting, if the user was observed to be in a conference room for 30 minutes, the aggregate speech context may be derived for that duration of the visit. The first duration and the second duration may be the same or different.

An aggregated context can be determined using the first and second context information by implementing a variety of techniques. For example, first context information could be re-aggregated across the second duration. If, e.g., a calendar event indicates that a user is to be at a meeting from 1pm to 2pm, but the user's location is dramatically changing across this time period, it may be determined that the user is not at the meeting and that another context is more appropriate. As another example, simultaneous co-variance between the first and second information can be determined. If, e.g., a microphone is detecting strong audio signals and a mobile device simultaneously detects that the device is in an "in-call" state, it may be determined that the user is on a call rather than engaging in an in-person conversation. As yet another example, the first and second durations can be compared. Suppose that, e.g., first and second information are collected so long as the information is substantially non-changing (e.g., the first information can identify that a mobile device is at a "home" position for time period #1, and the second information can identify that a mobile device that no Bluetooth™ devices are detected within a 10-foot radius during time period #2). If the time periods are generally the same, it may be determined that the user is home alone for the entire time. Otherwise, it may be estimated that the user is initially home alone, then at home with his family, and then at home during a social gathering.

Figure 4:
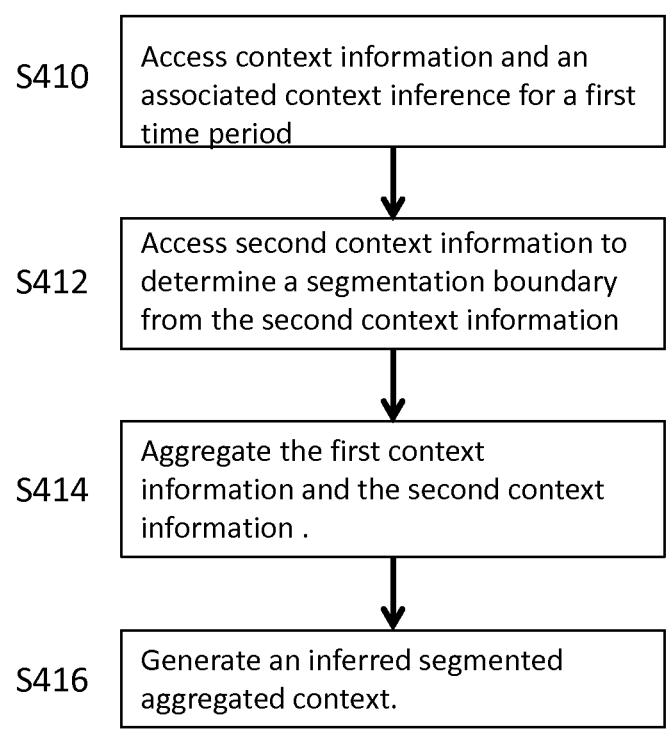
FIG. 4 describes a method of determining an aggregated context in accordance with one potential embodiment.

FIG. 4 describes an additional embodiment for determining inferred segmented aggregated context. In one potential embodiment described by FIG. 4, a context engine such as context engine 100 may access context information and determine an associated inferred context for a first time period. In S412, second context information may be accessed to identify a segmentation boundary from the second context information. In S414, the first and second context information may be aggregated, or merged. This may essentially be done by identifying a context consistent with the first and second context information, or by using the context segmentation boundary identified with the second context information as a flag that an inferred context from the first context information may be changing. In S416, an inferred segmented aggregated context may be generated from the first context information and the second context information. This may be the same context identified before the context segmentation boundary, or may be a different context.

Figure 5:
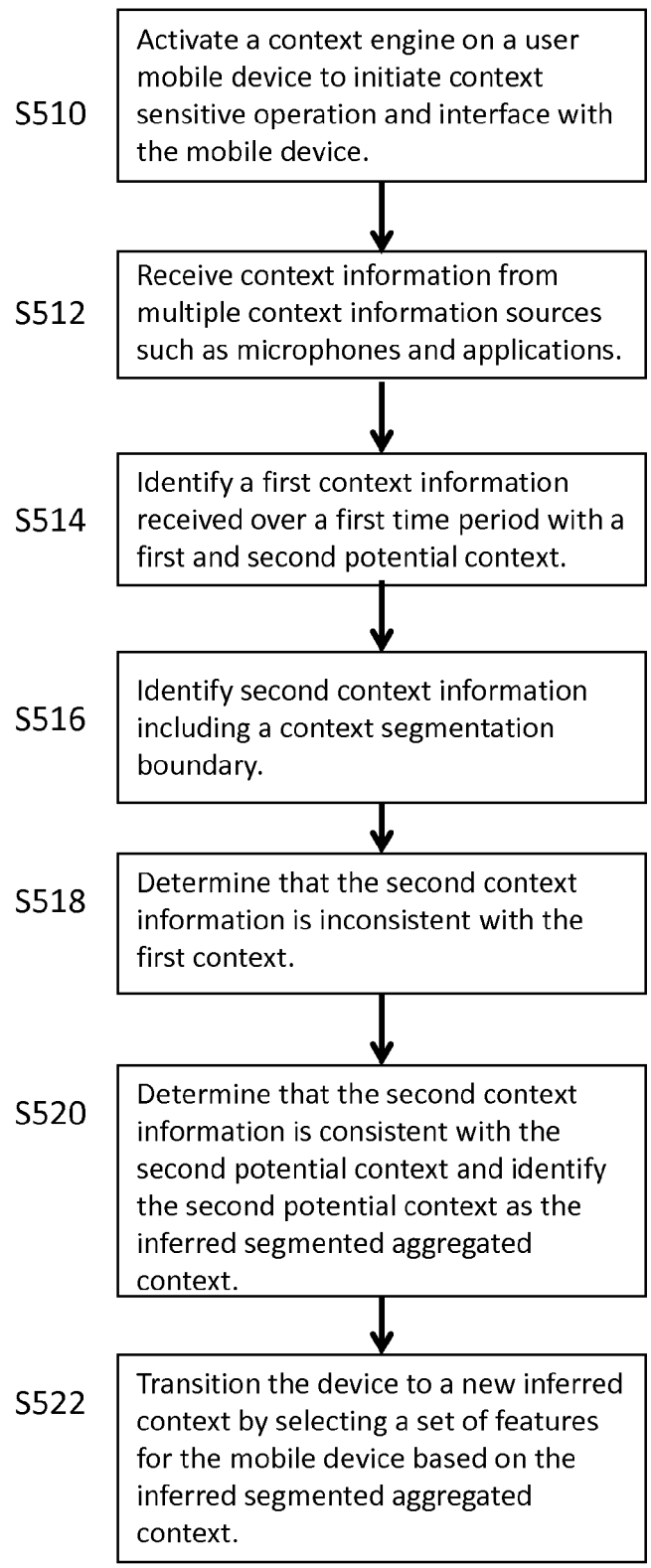
FIG. 5 describes a method of determining an aggregated context in accordance with one potential embodiment.

FIG. 5 describes one further additional embodiment for determining an inferred segmented aggregated context, and applying it to the operation of a mobile device. In S510, a device user may activate a context engine on a user mobile device to initiate context sensitive operation and interface with a mobile device. The user may apply to a website to subscribe to context services as part of such an activation, or may download an application as part of such activation. The user may further select user settings, defaults, privacy settings, and other similar settings for operation of a context engine. The user may also provide any required authorizations for the context engine or application to initiate gather of context information from hard and soft sensors on the mobile device and to enable access to this context information by the context engine.

In S512, the context engine may receive context information from multiple context information sources. As described above, these may be any sort of sensor providing information relevant to context in which a mobile device is operating. In S514, a first set of context information is identified for identifying potential contexts in which the mobile device is operating. In alternate embodiments, any number of potential contexts consistent with the first set of context information may be identified, and similarly particular contexts which are inconsistent with the first set of context information may be identified to eliminate potential contexts from consideration.

In S516, second context information is identified, and a context segmentation boundary is identified as part of the second context information. In S518, the context engine determines that the second context information is inconsistent with a first potential context, and in S520, the context engine determines that the second context information is consistent with the second potential context, at least in part thereby identifying the second potential context as the inferred segmented aggregated context. In S522, identification of the second potential context as the inferred segmented aggregated context is used to transition the device to a new set of features or device settings based on an association between the particular context and a set of mobile device settings.

FIG. 6 illustrates an example of a computing system in which one or more embodiments may be implemented. A computer system as illustrated in FIG. 6 may be incorporated as part of the previously described computerized devices such as the mobile device of FIG. 2 or any of the elements of a context engine or context inference system as described by FIGS. 1A and 1B. Any component of a system according to various embodiments may include a computer system as described by FIG. 6, including various mobile devices or networked devices and servers. FIG. 6 provides a schematic illustration of one embodiment of a computer system 600 that can perform the methods provided by various other embodiments, as described herein, and/or can function as either a mobile device for which a context is being determined or as a networked computing system which may process context information associated with a mobile device to determine a context of the mobile device. FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or similar communication interfaces. The communications subsystem 630 may permit data to be exchanged with a network (such as the network described below, to name one example), other computer systems, and/or any other devices described herein. In many embodiments, the computer system 600 will further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, an activity selection subsystem configured to provide some or all of the features described herein relating to the selection of activities by a context information module 140 can comprise hardware and/or software that is specialized (e.g., an application-specific integrated circuit (ASIC), a software method, etc.) or generic (e.g., processor(s) 610, applications 645, etc.) Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communications subsystem 630 (and/or the media by which the communications subsystem 630 provides communication with other devices). Hence, transmission media can also take the form of waves (including without limitation radio, acoustic and/or light waves, such as those generated during radio-wave and infrared data communications). Non-transitory storage media, on the other hand, may not take such forms, and in various embodiments, any storage medium that participates in providing data that causes a machine to operate in a specific fashion may be implemented using non-transitory storage media.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a non-transitory storage device 625 either before or after execution by the processor(s) 610.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted in a flow with process arrows. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method comprising:
accessing first context information for a device, the first context information associated with a first duration;
accessing second context information for the device;
determining a context segmentation boundary based at least in part on the second context information, the context segmentation boundary indicating an expected change from a first device context to a second device context;
deriving an inferred segmented aggregated context for the device based at least in part on an average inferred context based on averaging the first context information over at least a portion of the first duration, the second context information, and the context segmentation boundary.

2. The method of claim 1 wherein the first context information is ambient sound from a microphone and wherein the second context information is speech information from the microphone.

3. The method of claim 1, further comprising obtaining the first context information associated with the first duration at a mobile device using one or more sensors; and
obtaining the second context information using second sensors different from the one or more sensors, wherein the second sensors are at the mobile device or a different device.

4. The method of claim 1, wherein deriving the inferred segmented aggregated context comprises resetting the average inferred context to begin a new average context starting at a time associated with the context segmentation boundary.

5. The method of claim 4 wherein the time associated with the context segmentation boundary comprises a time at which the context segmentation boundary was detected; and
wherein a mobile device context setting associated with the inferred segmented aggregated context is delayed for a predetermined time following identification of the context segmentation boundary.

6. The method of claim 1, wherein deriving the inferred segmented aggregated context comprises:
associating the first context information with a first potential context;
determining that the second context information is inconsistent with the first potential context; and
identifying the inferred segmented aggregated context, the inferred segmented aggregated context being consistent with the second context information and different from the first potential context.

7. The method of claim 6, wherein accessing the second context information and determining the context segmentation boundary comprises computing individual context inferences of limited temporal relevance to identify expected context transitions.

8. The method of claim 1, wherein deriving an inferred segmented aggregated context is based on at least one of direct receipt of a context segmentation boundary from sensor data, detecting a change point based on the first context information and the second context information, or temporal clustering of sensor data from a plurality of sensors.

9. A method comprising:
determining, by a computing device, a first set of context inferences covering a first time period, wherein the first set of context inferences is determined from sensor data of the computing device;
determining from the first set of context inferences, a context segmentation boundary associated with a first time, the context segmentation boundary indicating an expected change from a first device context to a second device context;
determining, by the computing device, an average inferred second context based on averaging second context inferences from the sensor data associated with a second time following the first time within the first time period;
determining an inferred segmented aggregated context for the computing device from the second device context and the average inferred second context and the context segmentation boundary; and
selecting a set of device settings for the computing device based on the inferred segmented aggregated context.

10. The method of claim 9 further comprising identifying the context segmentation boundary from calendar data prior to determining the context segmentation boundary from the first set of context inferences.

11. The method of claim 9 further comprising identifying the context segmentation boundary from social networking check-in data prior to determining the context segmentation boundary from the first set of context inferences.

12. The method of claim 9 wherein the sensor data comprises microphone data detected based on an audio environment of the computing device.

13. The method of claim 9 wherein the sensor data comprises location data detected based on a location of the computing device.

14. The method of claim 9 wherein the sensor data comprises Bluetooth identifiers associated with Bluetooth™ devices proximate to the computing device.

15. The method of claim 9 wherein the sensor data comprises accelerometer data and wherein the context segmentation boundary is detected based on a change in the accelerometer data.

16. The method of claim 9 wherein the inferred segmented aggregated context is computed from the first set of context inferences and the average inferred second context by selecting a most commonly occurring individual context inference over a second time period, wherein the second time period is a subset of the first time period.

17. The method of claim 9 further comprising:
determining a confidence value associated with the inferred segmented aggregated context; and
determining that the confidence value is above a confidence threshold prior to selecting the set of device settings for the computing device based on the inferred segmented aggregated context.

18. The method of claim 17 wherein the inferred segmented aggregated context is computed from individual context inferences of the first set of context inferences and the average inferred second context by averaging a likelihood or a log-likelihood associated with each potential context, and outputting a highest value context as the inferred segmented aggregated context.

19. The method of claim 18 wherein the confidence value is computed as a function of averaged likelihood or averaged log-likelihood values for each potential context.

20. A mobile device comprising:
a processor;
a first sensor coupled to the processor; and
a non-transitory storage medium coupled to the processor, the storage medium including instructions, that when executed by the processor, cause the mobile device to:
access first context information for the mobile device, the first context information associated with a first duration;
access second context information for the mobile device;
determine a context segmentation boundary based at least in part on the second context information, the context segmentation boundary indicating an expected change from a first device context to a second device context;
derive an inferred segmented aggregated context for the mobile device based at least in part on an average inferred context based on averaging the first context information over at least a portion of the first duration, the second context information, and the context segmentation boundary.

21. A device comprising:
means for determining a first set of context inferences covering a first time period, wherein the first set of context inferences is determined from sensor data of a mobile device;
means for determining from the first set of context inferences, a context segmentation boundary associated with a first time, the context segmentation boundary indicating an expected change from a first device context to a second device context;
means for determining an average inferred second context based on averaging second context inferences from the sensor data associated with a second time following the first time within the first time period;
means for determining an inferred segmented aggregated context for the mobile device from the second context and the average inferred second context and the context segmentation boundary; and
means for selecting a set of device settings for the mobile device based on the inferred segmented aggregated context.

22. The device of claim 21 further comprising:
means for identifying the context segmentation boundary from calendar data prior to determining the context segmentation boundary from the first set of context inferences.

23. The device of claim 21 further comprising:
means for determining a confidence value associated with the inferred segmented aggregated context; and
means for determining that the confidence value is above a confidence threshold prior to selecting the set of device settings based on the inferred segmented aggregated context, wherein the inferred segmented aggregated context is computed from individual context inferences of the first set of context inferences and the average inferred second context by averaging a likelihood or a log-likelihood associated with each potential context, and outputting a highest value context as the inferred segmented aggregated context.

24. The method of claim 9, wherein determining an inferred segmented aggregated context comprises excluding context inferences prior to the context segmentation boundary.

25. The mobile device of claim 20, wherein the instructions, that when executed by the processor, further cause the mobile device to:
determine a confidence value for the inferred segmented aggregated context; and
responsive to determining that the confidence value is above a confidence threshold, selecting a set of device settings for the computing device based on the inferred segmented aggregated context.

26. The mobile device of claim 20 wherein the first sensor comprises a microphone and wherein the first context information comprises sound information recorded by the microphone; and
wherein the second context information comprises a meeting reminder stored in a calendar within the storage medium as part of a calendar application operated by the processor.

27. A non-transitory computer readable medium comprising computer readable instructions that, when executed by a processor, cause a device to:
determine, by the device, a first set of context inferences covering a first time period, wherein the first set of context inferences is determined from sensor data of the device;
determine from the first set of context inferences, a context segmentation boundary associated with a first time, the context segmentation boundary indicating an expected change from a first device context to a second device context;
determine, by the device, an average inferred second context based on averaging second context inferences from the sensor data associated with a second time following the first time within the first time period;
determine an inferred segmented aggregated context for the device from the second device context and the average inferred second context and the context segmentation boundary; and
select a set of device settings for the device based on the inferred segmented aggregated context.

28. The non-transitory computer readable medium of claim 27, wherein the sensor data comprises device location data; and
wherein the computer-readable instructions are further configured to cause the device to determine from the first set of context inferences, the context segmentation boundary associated with the first time delineating a first context prior to the first time from the second context following the first time within the first time period comprises identifying a movement across a door threshold to enter a room.

29. The non-transitory computer readable medium of claim 28, wherein the inferred segmented aggregated context comprises a meeting context associated with the room.

* * * * *